United States Patent
Qadeer et al.

(10) Patent No.: US 7,650,595 B2
(45) Date of Patent: Jan. 19, 2010

(54) SOUND TRANSACTION-BASED REDUCTION WITHOUT CYCLE DETECTION

(75) Inventors: Shaz Qadeer, Seattle, WA (US); Sriram K. Rajamani, Bellevue, WA (US); Vladimir A. Levin, Redmond, WA (US); Robert Palmer, Salt Lake City, UT (US)

(73) Assignee: Microsoft Corporation, Redmond, WA (US)

( * ) Notice: Subject to any disclaimer, the term of this patent is extended or adjusted under 35 U.S.C. 154(b) by 888 days.

(21) Appl. No.: 11/119,530

(22) Filed: Apr. 29, 2005

(65) Prior Publication Data

US 2006/0248515 A1 Nov. 2, 2006

(51) Int. Cl.
G06F 9/44 (2006.01)

(52) U.S. Cl. .................. 717/127; 717/131
(58) Field of Classification Search .......... 717/127–133
See application file for complete search history.

(56) References Cited

U.S. PATENT DOCUMENTS 7,111,294 B2 * 9/2006 Steensgaard ................ 718/100

OTHER PUBLICATIONS

Bruening et al. "Systematic Testing of Multithreaded Programs", 2000, pp. 1-11.*
Derek L. Bruening "Systematic Testing of Multithreaded Java Programs", 1999, pp. 1-150.*
Andrews et al., "Zing: Exploiting Program Structure for Model Checking Concurrent Software," *CONCUR 2004: 15th Int'l Conf. on Concurrency Theory*, London (Sep. 2004).
Ball et al., "The SLAM Project: Debugging System Software Via Static Analysis," *POPL 02: ACM SIGPLAN-SIGACT Symp. on Principles of Programming Languages*, pp. 1-3 (Jan. 2002).
Brat et al., "Java PathFinder: Second Generation of a Java Model Checker," *Proc. Post-CAV Workshop on Advances in Verification* (Jul. 2000).
Clarke, "Model Checking with the Partial Order Reduction," pp. 1-42 [Downloaded from the World Wide Web on Mar. 7, 2005].
Qadeer et al., "Summarizing Procedures in Concurrent Programs," *POPL '04: ACM SIGPLAN-SIGACT Symp. on Principles of Programming Languages*, pp. 245-255, Venice, Italy (Jan. 2004).
Holzmann, "The Model Checker SPIN," *IEEE Transactions on Software Eng'g*, vol. 38, No. 5, pp. 279-295 (May 1997).
Godefroid, "Model Checking for Programming Languages Using Verisoft," *POPL: 24th ACM Symp. on Principles of Programming Languages*, pp. 174-186 (Jan. 1997).
Musuvathi et al., "CMC: A Pragmatic Approach to Model Checking Real Code," *OSDI '02: 5th Symp. on Operating Systems Design and Implementation* (Dec. 2002).
Dill, "The Murphi Verification System," *CAV 1996: 8th Int'l Conf. on Computer Aided Verification*, vol. 1102, pp. 390-393 (1996).

(Continued)

*Primary Examiner*—Wei Y Zhen
*Assistant Examiner*—Phillip H Nguyen
(74) *Attorney, Agent, or Firm*—Klarquist Sparkman, LLP

(57) ABSTRACT

Described techniques and tools help model checking scale to large programs while reducing missed errors. In particular, described techniques and tools help reduce the state space of concurrent programs without depending on cycle detection and without scheduling execution of postponed threads at all cycles. For example, described techniques and tools use a type of partial-order reduction called transaction-based reduction to reduce program state space. Analysis is performed at commit points to determine whether to schedule delayed threads.

17 Claims, 10 Drawing Sheets

OTHER PUBLICATIONS

Havelund et al., "Applying Model Checking in Java Verification," *6thSPIN99: The 6th International SPIN Workshop on Practical Aspects of Model Checking*, pp. 216-231, Toulouse, France (Sep. 1999).

Penix et al., "Verification of Time Partitioning in the DEOS Scheduler Kernel," *22nd Int'l Conf. on Software Eng'g*, pp. 488-498 (Jun. 2000).

Penix et al., "Verifying Time Partitioning in the DEOS Scheduling Kernel," 40 pp. (Jan. 2004).

Holzmann et al., "An Improvement in Formal Verification," *Proc. of Conf. on Formal Description Techniques (FORTE94)*, 13 pp. (Aug. 1994).

Levin et al., "Sound Transaction-Based Reduction Without Cycle Detection," *Technical Report MSR-TR-2005-40*, Microsoft Research (Apr. 2005).

Nalumasu et al., "An Efficient Partial Order Reduction Algorithm with an Alternative Proviso Implementation," *Formal Methods in System Design*, vol. 20, No. 3 pp. 231-247 (May 2002).

Godefroid, "Partial-Order Methods for the Verification of Concurrent Systems: An Approach to the State-Explosion Problem," *Lecture Notes in Computer Science 1032*, Springer-Verlag, New York (1996).

Clarke et al., *Model Checking*, MIT Press (1999).

Peled, "Partial Order Reduction: Model-Checking Using Representatives," *Proc. 21st Int'l Symp. on Mathematical Foundations of Computer Science*, pp. 93-112 (Sep. 1996).

Kurshan et al., "Combining Software and Hardware Verification Techniques," *Formal Methods in System Design*, pp. 251-280 (2002).

Lipton, "Reduction: A Method of Proving Properties of Parallel Programs," *Communications of the ACM*, vol. 18, No. 12, pp. 717-721 (Dec. 1975).

Flanagan et al., "Types for Atomicity," *Proc. 2003 ACM SIGPLAN Int'l Workshop on Types in Languages Design & Implementation*, pp. 1-12 (Jan. 2003).

Flanagan et al., "A Type and Effect System for Atomicity," *Proc. of the ACM SIGPLAN 2003 Conf. on Programming Language Design & Implementation*, pp. 338-349 (Jun. 2003).

Flanagan et al., "Transactions for Software Model Checking," *Electronic Notes in Theoretical Computer Science*, vol. 89, No. 3 (2003).

Curbera et al., "Business Process Execution Language for Web Services, Version 1.0," *IBM developer Works* (Jul. 2002) [downloaded from the World Wide Web on Mar. 9, 2005].

Valmari, "A Stubborn Attack on State Explosion (abridged version)," *Proc. 2nd Int'l Workshop on Computer Aided Verification*, pp. 156-165 (1990).

Stoller et al., "Optimistic Synchronization-based State-space Reduction," *Lecture Notes in Computer Science*, vol. 2619, pp. 489-504 (Apr. 2003).

Dwyer et al., "Exploiting Object Escape and Locking Information in Partial-Order Reductions for Concurrent Object-Oriented Programs," *Formal Methods in System Design*, vol. 25, No. 2-3, pp. 199-240 (document dated Mar. 2004, published Sep.-Nov. 2004).

\* cited by examiner

Figure 7

```
int g = 0;

void T1() {
L0:    g = 1;
L1:    skip;
L2:    while(true){
L3:        skip;
       }
L4:    return;
} void T2() {
M0:    assert(g == 0);
M1:    return;
}

```
int g = 0;

void T1() {
L0:    g = 1;
L1:    skip;
L2:    if (*) {
L3:        while(true){
L4:            skip;
L5:        }
       }
L6:    return;
} void T2() {
M0:    assert(g == 0);
M1:    return;
}

P = { T1() } || { T2() }
```

```
int g = 0;

void T1() {
L0:    g = 1;
L1:    skip;
L2:    assume(false);
L3:    return;
} void T2() {
M0:    assert(g == 0);
M1:    return;
}

P = { T1() } || { T2() }
```

```
Mutex m;
int x = 0; /* all accesses to x will be guarded by m*/
int y = 0; /* accesses to y are not guarded */ void T1() {
L0: acq(m);
L1: y := 42;
L2: x := 1;
L3: rel(m);
L4: while (true)
      { skip; }
}
void T2() {
M0: acq(m);
M1: assert(x == 0);
M2: rel(m);
}
void T3() {
N0: y = 10;
}

$$\left[ \begin{array}{l} p = p_1 \xrightarrow{+}_{t(1)} p_2 \xrightarrow{+}_{t(2)} p_3 \cdots p_k \xrightarrow{+}_{t(k)} p_{k+1} = q_1 \xrightarrow{+}_{u(1)} q_2 \xrightarrow{+}_{u(2)} q_3 \cdots q_l \xrightarrow{+}_{u(l)} q_{l+1} = q \\ \left( p_2 = p_{2,1} \xrightarrow{}_{t(2)} \cdots \xrightarrow{}_{t(2)} p_{2,x} = p_3 \right) \quad \left( q_2 = q_{2,1} \xrightarrow{}_{u(2)} \cdots \xrightarrow{}_{u(2)} q_{2,x} = q_3 \right) \end{array} \right]$$

Figure 12

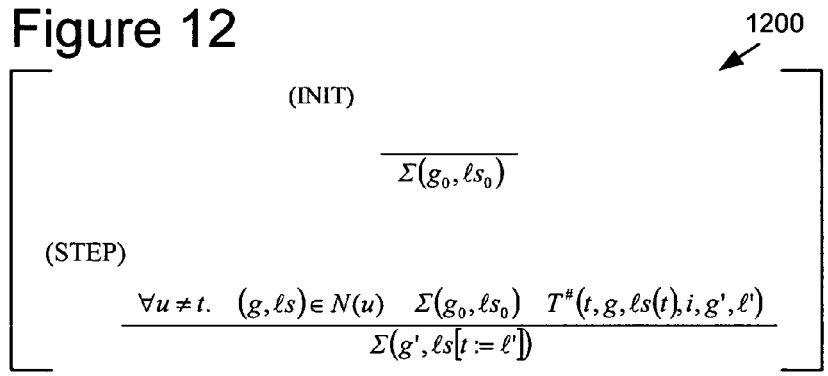

Figure 13

```
record TraversalInfo {
   state : State
   tid : Tid
   numTids : Tid
   choice : int
   LM : Boolean
   RM : Boolean
   Xend : Boolean
   CPC : Boolean
}
```

```
Hashtable table;
Stack stack;
TraversalInfo q, q', q'', pred;
stack = new Stack
table = new Hashtable L0:  q' = { state = (g₀, ℓs₀),
            tid = 1,
            numTids = 1,
            choice = 1,
            CPC = true,
            Xend = true,
            LM = false
            RM = false }

L1:  table.Add(q'.state, q')
L2:  stack.Push(q')

L3:  while (stack.Count > 0)
L4:     q = stack.Peek()
L5:     if (Enabled(q))
L6:        q' = Execute(q)
L7:        q.Xend = q.Xend || (¬Phase(q.tid, q.state) && ¬q'.LM)
L8:        q.CPC = q.CPC || q.Xend
L9:        if (IsMember(table, q'.state))
L10:          q'' = Lookup(table, q'.state
L11:          q.CPC = q.CPC || q''.CPC
L12:       else /* undiscovered state */
L13:          table.Add(q'.state, q')
L14:          stack.Push(q')
L15:       end if
L16:       q.choice = q.choice + 1
L17:    else
L18:       q.Xend = q.Xend || (¬Phase(q.tid, q.state) && ¬q.CPC)
L19:                                          (* && ¬q.RM *))
L20:       q.CPC = q.CPC || q.Xend
L21:       stack.Pop()
L22:       pred = stack.Peek()
L23:       pred.CPC = pred.CPC || q.CPC
L24:       if (q.Xend && q.numTids < |Tid|)
L25:          q' = Update(q)
L26:          stack.Push(q')
L27:       end if
L28:    end if
L29: end while
```

```
Boolean Enabled(TraversalInfo q) {
   let (g,ℓs) = q.state in
   return (∃ g',ℓ'. T#(q.tid, g, ℓs(q.tid), q.choice, g', ℓ'))
}

TraversalInfo Execute(TraversalInfo q) {
   let (g, ℓs) = q.state in
   let (g', ℓ') = T#(q.tid, g, ℓs(q.tid), q.choice) in
   State succ = (g', ℓs[q.tid := (ℓ')])
   return { state = succ,
            tid = q.tid,
            numTids = 1,
            choice = 1,
            CPC = false,
            Xend = false,
            LM = LM(q.tid, q.state, succ)
            RM = RM(q.tid, q.state, succ) }
}

TraversalInfo Update(TraversalInfo q) {
   Tid nextTid = ite((q.tid == |Tid|), 1, q.tid + 1)
   return { state = q.state,
            tid = nextTid,
            numTids = q.numTids + 1,
            choice = 1,
            CPC = q.CPC,
            Xend = q.Xend,
            LM = q.LM
            RM = q.RM }
}
```

| Example | Lines of Code | Unsound Reduction (states explored) | CPC (states explored) | Cycle Detection (states explored) |
|---|---|---|---|---|
| AuctionHouse | 798 | 108 | 108 | 108 |
| FlowTest | 485 | 4656 | 4656 | 4656 |
| Shipping | 1844 | 206 | 206 | 222 |
| Conc | 392 | 512 | 512 | 2063 |
| Peterson | 793 | 1080 | 1213 | 342 |
| Bluetooth | 2768 | 48109 | 52092 | 116559 |
| TransactionManager | 6927 | 1220517 | 1264894 | 1268571 |
| AlternatingBit | 130 | 1180 | 1180 | 1349 |
| Philosophers | 76 | 87399 | 87399 | 428896 |
| Bakery | 104 | 10221 | 14935 | 14254 |

1700

```
int g = 0;
void T1() {
L0:     g = 1;
L1:     skip;
L2:     if (*) {
L2:         while(true){
L3:             skip;
L4:         }
        }
        else {
L5:         while(true){
L6:             skip;
L7:         }
        }
L8:     return;
}
void T2() {
M0:     assert(g == 0);
M1:     return;
}

P = { T1() } || { T2() }
```

Software 1880 with Described Techniques
and Tools for Sound Partial-order Reduction

SOUND TRANSACTION-BASED REDUCTION WITHOUT CYCLE DETECTION

FIELD

This application relates to testing and modeling of computer programs.

BACKGROUND

In the field of computer software testing, different approaches have been developed to more accurately and completely test program function. For example, program modeling and model checking allow certain kinds of debugging analysis that may not otherwise be possible or practical in direct analysis of a program.

The state space of a program is the set of possible states that a program can potentially be in while it is executing. For most non-trivial programs, the state space is very large and difficult, if not impossible, to test exhaustively. Program models simplify certain aspects of programs to reduce the state space that needs to be explored to detect errors in the program, and such models therefore facilitate more complete testing of the overall behavior of programs. Program models can be used to analyze programs as a whole, or, for larger programs, to analyze them one part at a time. When errors are found, changes can then be made to the program source code to correct the errors.

Concurrent (or, multithreaded) programs have two or more program threads that can execute at the same time. In a concurrent program, one program thread can perform actions that affect other threads (e.g., by affecting a program variable that is used by another thread). Even when the execution of one thread in isolation results in no errors, the concurrent execution of another thread may affect the first thread (or vice versa) and result in an error that was previously hidden. An interaction between threads is called an interleaving. The number of possible interleavings between threads can expand the state space of a concurrent program well beyond the state space of individual threads. Therefore, concurrent programs present additional challenges in terms of error detection and modeling program behavior.

Partial-order reduction techniques have been developed that reduce the state space of a concurrent program in order to allow error checking in a concurrent program that would otherwise have a state space too big to be explored completely. Partial-order reduction techniques work by delaying execution of some threads in order to reduce the number of interleavings between threads. For example, if a program consists of two threads, $t_1$ and $t_2$, the state space of thread $t_1$ can be explored while the execution of thread $t_2$ is delayed. As long as thread $t_2$ is eventually executed, the program can still be accurately modeled.

In some cases, threads enter loops, or cycles, from which they do not exit. In the context of modeling concurrent programs, this gives rise to a condition known as the ignoring problem. For example, if the execution of thread $t_1$ is explored while the execution of thread $t_2$ is delayed, and thread $t_1$ enters a loop from which $t_2$ can never be executed, the execution of thread $t_2$ is delayed indefinitely and cannot be properly tested. If thread $t_2$ is delayed indefinitely, errors that occur during the execution of thread $t_2$ may not be discovered, making the partial-order reduction algorithm unsound.

Cycle detection is one way of dealing with the ignoring problem in partial-order reduction. In partial-order reduction techniques that use cycle detection, whenever a cycle is detected in a thread that is being explored, the detected cycle is closed and other threads in the program are then scheduled to be executed. FIGS. 1 and 2 illustrate a partial-order reduction technique with cycle detection in a concurrent program with two threads, $t_1$ and $t_2$. In FIG. 1, thread $t_1$ is being explored while thread $t_2$ is postponed. The execution of thread $t_1$ includes a path 150 that leads to cycle 170, and a path 160 that does not lead to a cycle. Cycle detection 110 is used to schedule execution of thread $t_2$ when cycle 170 in thread $t_1$ is detected, thereby avoiding the ignoring problem. In FIG. 2, the execution of thread $t_1$ includes a path 250 that leads to cycle 270, and a path 260 that leads to cycle 280. In FIG. 2, cycle detection 210 is used to schedule execution of thread $t_2$ when cycles 270 and 280 in thread $t_1$ are detected.

As illustrated in FIGS. 1 and 2, prior partial-order reduction techniques avoid the ignoring problem with cycle detection, but add scheduled thread executions at detected cycles.

Whatever the benefits of prior techniques, they do not have the advantages of the following techniques and tools.

SUMMARY

In summary, techniques and tools for sound partial-order reduction without cycle detection are described.

Described techniques and tools help model checking scale to large programs while reducing missed errors. In particular, described techniques and tools help reduce the state space of concurrent programs without depending on cycle detection and without scheduling execution of postponed threads at all cycles. For example, described techniques and tools use a type of partial-order reduction called transaction-based reduction to reduce program state space. Analysis is performed at commit points to determine whether to schedule delayed threads.

The various techniques and tools can be used in combination or independently. Different embodiments implement one or more of the described techniques and tools.

Additional features and advantages will be made apparent from the following detailed description of different embodiments that proceeds with reference to the accompanying drawings.

BRIEF DESCRIPTION OF THE DRAWINGS

FIG. 7 is a code listing for an example program that demonstrates the ignoring problem.

FIG. 8 is a code listing for an example program demonstrating that cycle detection is not necessary for sound partial-order reduction.

FIG. 11 is a table showing a sequence of transactions.

FIG. 12 is a table showing an algorithm for model checking with reduction.

FIG. 13 is a code listing showing a declaration for a "TraversalInfo" record.

FIG. 14 is a code listing showing a commit point completion algorithm.

FIG. 15 is a code listing showing helper functions for the commit point completion algorithm of FIG. 14.

DETAILED DESCRIPTION

Figure 1:
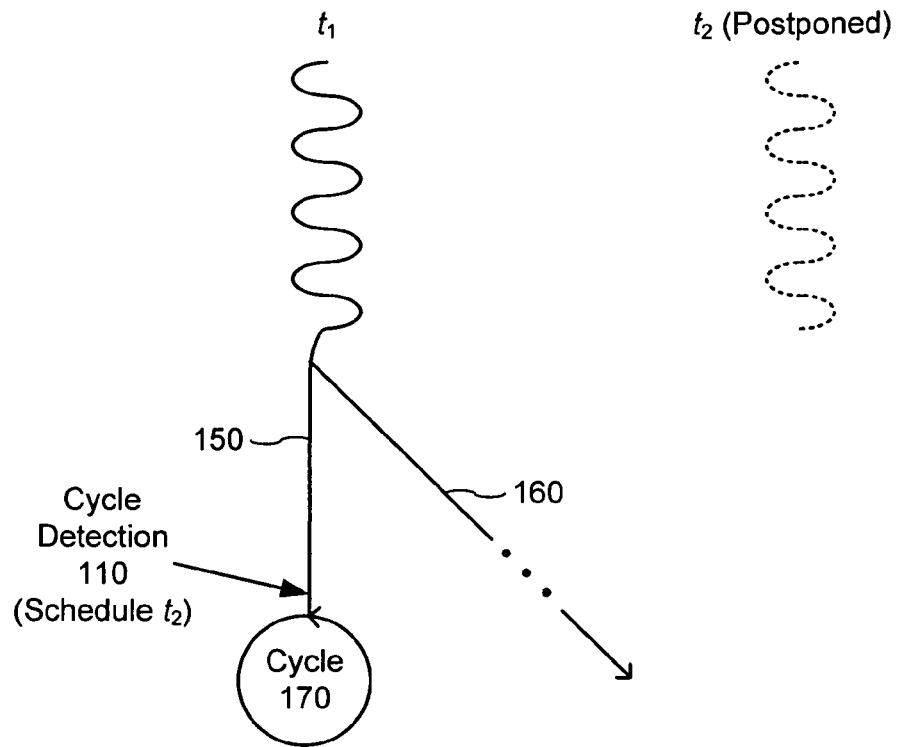
FIGS. 1 and 2 are diagrams showing partial-order reduction with cycle detection according the prior art.

Described implementations are directed to techniques and tools for sound partial-order reduction without cycle detection. Described techniques and tools facilitate efficient model checking for concurrent programs.

A detailed example section describes a partial-order reduction algorithm using commit points (e.g., a commit point completion (CPC) algorithm for transaction-based reduction), and an implementation of the algorithm in a model checker.

Various alternatives to the implementations described herein are possible. For example, techniques described with reference to flowchart diagrams can be altered by changing the ordering of stages shown in the flowcharts, by repeating or omitting certain stages, etc. As another example, although some implementations are described with reference to specific program abstraction methods, modeling methods, model checkers and/or algorithmic details for partial-order reduction, other program abstraction methods, modeling methods, model checkers or variations on the described algorithmic details also can be used.

The various techniques and tools can be used in combination or independently. Different embodiments implement one or more of the described techniques and tools. Some techniques and tools described herein can be used in a model checker, or in some other system not specifically limited to model checking.

I. Techniques and Tools for Sound Partial-Order Reduction

Model checking is a technique that can be used to find errors and improve the reliability of concurrent programs. Described techniques and tools help model checking scale to large programs while reducing missed errors. In particular, described techniques and tools help reduce the state space of concurrent programs without depending on cycle detection and without scheduling execution of postponed threads at all cycles.

Sound Partial-Order Reduction Without Cycle Detection

In partial-order reduction techniques that use cycle detection, whenever a cycle is detected in a thread that is being explored, the detected cycle is closed and other threads in the program are then scheduled to be executed. Referring again to FIG. 1, in a partial-order reduction technique with cycle detection for a concurrent program with two threads, $t_1$ and $t_2$, thread $t_1$ is being explored while thread $t_2$ is postponed. The execution of thread $t_1$ includes a path 150 that leads to cycle 170, and a path 160 that does not lead to a cycle. Cycle detection 110 is used to schedule execution of thread $t_2$ when cycle 170 in thread $t_1$ is detected. Referring again to FIG. 2, the execution of thread $t_1$ includes a path 250 that leads to cycle 270, and a path 260 that leads to cycle 280, and cycle detection 210 is used to schedule execution of thread $t_2$ when cycles 270 and 280 in thread $t_1$ are detected.

Figure 2:
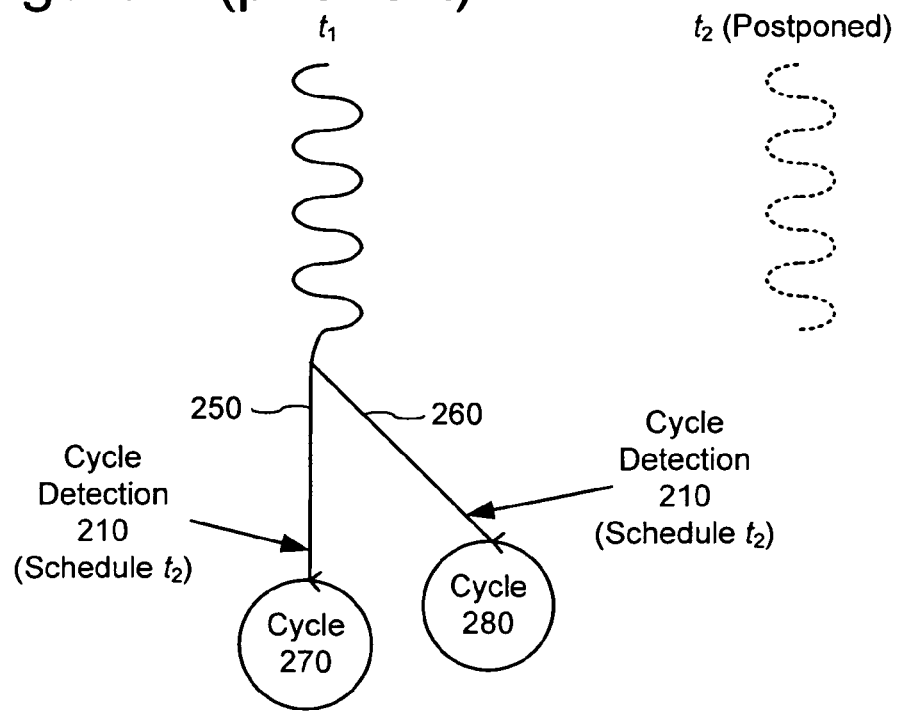

As illustrated in FIGS. 1 and 2, prior partial-order reduction techniques add scheduled thread executions at detected cycles. This can lead to a very large state space to be explored, especially in concurrent programs with a lot of cycles and a large number of threads. Although scheduling delayed threads for execution at all detected cycles avoids the ignoring problem, such prior methods do not take advantage of the idea that the central requirement of avoiding the ignoring problem is just to ensure that delayed threads will eventually be executed.

The described techniques and tools are based on the discovery that sound partial-order reduction can be achieved without scheduling delayed threads at all cycles. Scheduling delayed threads for execution based on cycle detection leads to unnecessary exploration of program state space. Described techniques and tools reduce the number of interleavings that are explored and, therefore, improve efficiency in program modeling and testing.

Commit Points

Described techniques and tools use commit points to avoid unnecessary scheduling of delayed threads.

A commit point is the state of a program that immediately follows the invocation of a committing action. A committing action is an action performed by a thread that affects (or potentially affects) another thread (e.g., an access of a shared variable). For example, an access by a thread $t_1$ of a global variable "g" that is shared by thread $t_1$ and a second thread, $t_2$, is a committing action. The state after this action is invoked is called a commit point.

After finding a commit point, described techniques and tools determine whether there is some path from the commit point that will allow delayed threads to be executed. Recall that the key idea to avoiding the ignoring problem is that delayed threads should not be delayed indefinitely. Therefore, if there is a path from the commit point such that delayed threads will be allowed to execute, the delayed threads do not need to be scheduled at the commit point. If, on the other hand, there is no path from the commit point that will allow delayed threads to be executed (e.g., where thread $t_1$ necessarily enters a non-terminating loop immediately after the commit point), described techniques and tools then schedule the delayed threads.

Figure 3:
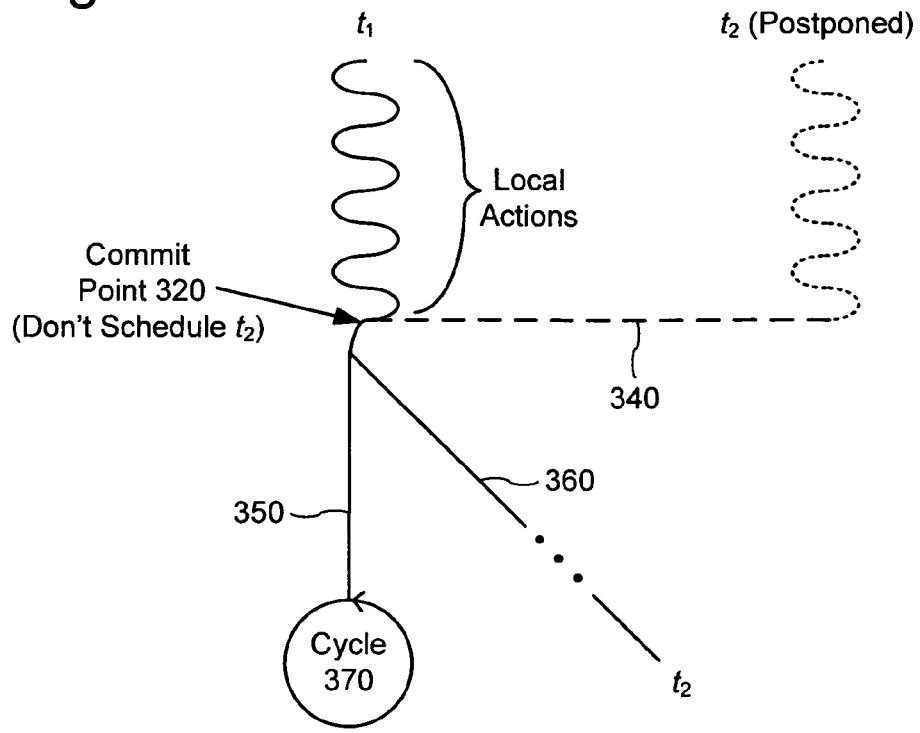
FIGS. 3 and 4 are diagrams showing a technique for partial-order reduction using commit points.
Figure 4:
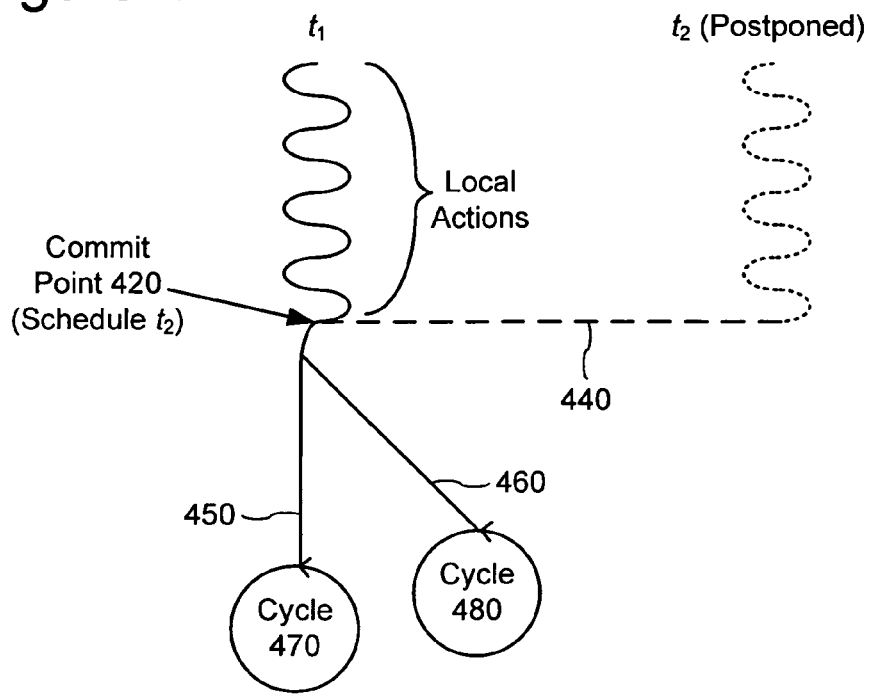

FIGS. 3 and 4 illustrate described partial-order reduction techniques that determine whether to schedule execution of delayed threads at commit points, and do not depend on cycle detection. For the sake of simplicity, FIGS. 3 and 4 each show a concurrent program with two threads, $t_1$ and $t_2$, and a single commit point with two paths leading from the commit point. However, described techniques and tools can be used on concurrent programs with potentially any number of threads and commit points, and any number of paths from the commit points.

In FIG. 3, thread $t_1$ is being explored while thread $t_2$ is postponed. In the example shown in FIG. 3, the thread $t_1$ is shown with local actions (actions that can only affect the state of thread $t_1$) followed by a committing action that potentially affects postponed thread $t_2$. The committing action is represented by a dashed horizontal line (340). The state following invocation of the committing action is indicated as a commit point (320). The paths leading from commit point 320 consist of a path 350 that leads to cycle 370, and a path 360 that does not lead to a cycle. Path 360 eventually allows execution of thread $t_2$. Because there is a path from commit point 320 that allows execution of the delayed thread $t_2$, execution of thread $t_2$ is not scheduled at the commit point.

In FIG. 4, the paths leading from commit point 420 consist of a path 450 that leads to cycle 470, and a path 460 that leads to cycle 480. In this example, thread $t_2$ will not execute from either path leading from commit point 420. Therefore, the commit point algorithm schedules the execution of $t_2$ and avoids an indefinite delay of the thread.

Determining whether to schedule delayed threads for execution at commit points instead of at detected cycles avoids unnecessary scheduling of delayed threads. For example, in the example shown in FIG. 3, the described technique does not schedule thread $t_2$ for execution since there is a path from commit point 320 that allows execution of $t_2$. However, a partial-order reduction algorithm that schedules delayed threads at all detected cycles would have scheduled delayed thread $t_2$ at cycle 370, even though path 360 eventually leads to an execution of $t_2$.

Figure 5:
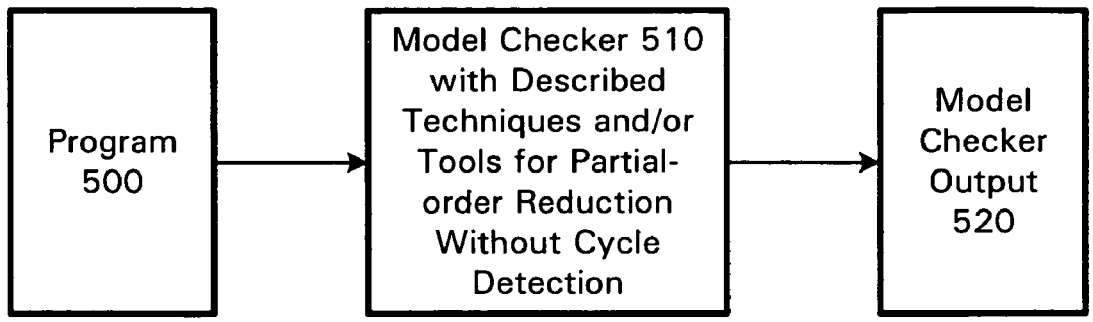
FIG. 5 is a diagram showing a model checking system implementing described techniques and tools for sound partial-order reduction.

FIG. 5 shows a simplified system diagram for a model checking system with one or more of the described techniques and tools. For an input program 500, a model checker 510 with described techniques and/or tools for partial order reduction without cycle detection (e.g., a commit point completion algorithm) generates model checker output 520. Model checker output 520 can include, for example, error analysis, suggestions for resolving errors, model checking statistics, etc.

Figure 6:
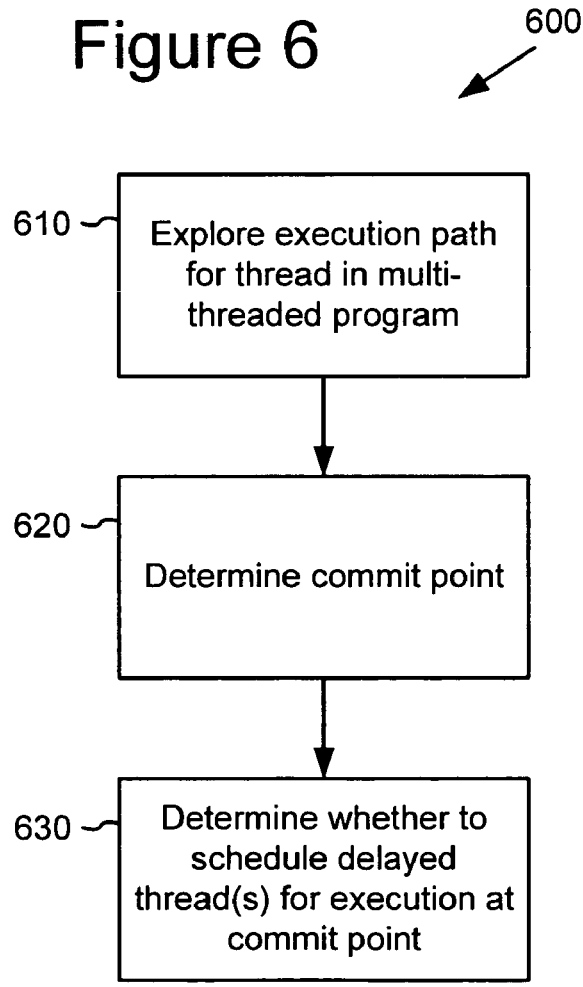
FIG. 6 is a flow diagram showing a technique for determining whether to schedule delayed threads at a commit point.

FIG. 6 shows an example technique. In general, the techniques described herein can be performed using some combination of tools described herein or other available tools (e.g., program abstraction tools, model checking tools, etc.) and/or analysis (such as programmer analysis).

FIG. 6 is a flow chart showing a technique 600 for determining whether to schedule delayed threads at a commit point. At 610, an execution path for a thread in a multi-threaded (concurrent) program is explored. For example, local actions of the thread are explored while looking for a commit point. At 620, a commit point is determined. Then, at 630, it is determined whether to schedule one or more delayed threads for execution at the commit point. For example, a search (e.g., a depth-first search) of execution paths from the commit point is performed to determine whether any delayed threads should be scheduled.

II. Detailed Example

The following detailed example describes an algorithm and implementation for sound partial-order reduction without cycle detection. The features and limitations described in this example can be varied in other implementations. For example, although this detailed example describes a specific implementation of a particular algorithm in a particular model checker, other implementations having different features are possible, and such implementations can be implemented in other kinds of model checkers or systems not limited to model checking.

A. Introduction

Partial-order reduction is widely used to alleviate state space explosion in model checkers for concurrent programs. Partial-order reduction algorithms work typically by delaying the execution of certain threads, thus avoiding the redundant exploration of equivalent interleavings. However, delaying the execution of a thread indefinitely can lead to loss of soundness. This is called the ignoring problem in partial-order reduction. The usual solution to the ignoring problem is by cycle detection. Explicit state model checkers usually use depth-first searching, and when a cycle is detected, all delayed threads are scheduled immediately. Though widely used, cycle detection is not necessary for sound reduction.

This detailed example presents a different solution to the ignoring problem, a solution that is not based on cycle detection. We designate certain states as commit points and track the exploration to discover whether the reduced exploration guarantees a path from each commit point to a state where delayed threads are indeed scheduled. If such a path does not exist, we detect this at the time a commit point is popped from a stack, and schedule the delayed threads at the commit point.

This detailed example presents an algorithm, called Commit Point Completion (CPC), and its soundness proof. Both CPC and cycle detection have been implemented in Microsoft Corporation's Zing model checker. The CPC algorithm generally produces fewer interleavings than cycle detection, resulting in faster model checking. In particular, CPC outperforms cycle detection in examples that arise from iterative abstraction refinement.

Partial order methods have been widely used as an optimization in building model checkers for concurrent software. See, e.g., Clarke and Grumberg, *Model Checking*, MIT Press (1999); Valmari, "A Stubborn Attack on State Explosion," *Proc. 2nd Int'l Workshop on Computer Aided Verification*, pp. 156-65 (1990); Holzmann et al., "An Improvement in Formal Verification", *Proc. of Conf. on Formal Description Techniques (FORTE94)*, 13 pp. (August 1994); Peled, "Partial Order Reduction: Model-Checking Using Representatives," *Proc. 21st Int'l Symp. on Mathematical Foundations of Computer Science*, pp. 93-112 (September 1996); Godefroid et al., *Partial-Order Methods for the Verification of Concurrent Systems: An Approach to the State-Explosion Problem*, Springer-Verlag (1996); Godefroid, "Model Checking for Programming Languages Using Verisoft," *POPL: 24th ACM Symp. on Principles of Programming Languages*, pp. 174-186 (January 1997). Traditional partial order reduction methods are based on the notion of independence between actions. Two actions $\alpha$ and $\beta$ are independent if (1) they do not disable one another and (2) if both actions are enabled in a state s, then executing them in the order $\alpha$ followed by $\beta$ from s, or in the order $\beta$ followed by $\alpha$ from s, leads to the same resulting state. Partial order reduction algorithms explore a subset of enabled actions in each state called the ample set. The set of all actions enabled in a state s is denoted Enabled(s), the ample set of actions in a state s is denoted Ample(s), and Ample(s) $\subseteq$ Enabled(s). For partial order reduction to be sound, ample sets need to be chosen in such a way that a transition that is dependent on a transition in Ample(s) cannot execute without a transition in Ample(s) occurring first. Choosing a minimal ample set satisfying this condition is a very hard problem. In practice, ample sets are formed from local actions, and from restricted versions of send and receive actions, such as: sending to a queue, with the sender having exclusive rights of sending to the queue, and receiving from a queue, with the receiver having exclusive rights of receiving from the queue. If the system consists of threads interacting via shared memory, Lipton's theory of reduction provides an alternate way to do partial order reduction. See Lipton, "Reduction: A Method of Proving Properties of Parallel Programs," *Communications of the ACM*, vol. 18, no. 12, pp. 717-21 (December 1975), for more information on Lipton's theory of reduction.

Reduction views a transaction as a sequence of actions $a_1, \ldots, a_m, x, b_1, \ldots, b_n$ such that each $a_i$ is a right mover and each $b_i$ is a left mover. A right mover is an action that commutes to the right of every action by another thread; a left mover is an action that commutes to the left of every action by another thread. Thus, to detect transactions we need to detect right and left movers. Most programs consistently use mutexes to protect accesses to shared variables; we can exploit this programming discipline to infer left and right movers:

The action acquire(m), where m is a mutex, is a right mover.

The action release(m) is a left mover.

An action that accesses only a local variable or shared variable that is consistently protected by a mutex is both a left mover and a right mover.

A transaction is a sequence of right movers, followed by a committing action that is not a right mover, followed by a sequence of left movers. A transaction can be in two states: pre-commit or post-commit. A transaction starts in the pre-commit state and stays in the pre-commit state as long as right movers are being executed. When the committing action is executed, the transaction moves to the post-commit state. The transaction stays in the post-commit state as long as left movers are being executed until the transaction completes. In addition to being able to exploit programmer-imposed discipline such as protecting each shared variable consistently with the same lock, transaction-based reduction allows extra optimizations such as summarization. For more information, see Qadeer, Rajamani, and Rehof, "Summarizing Procedures in Concurrent Programs," *POPL '04: ACM SIGPLAN-SIGACT Symp. on Principles of Programming Languages*, pp. 245-55, Venice, Italy (January 2004).

All partial-order reduction algorithms work by delaying the execution of certain threads, thus avoiding the redundant exploration of equivalent interleaving orders. For instance, if thread $t_1$ executes an action from state $s_1$ that reads and writes only local variables, then thread $t_2$ does not need to be scheduled to execute in $s_1$, and $t_2$'s scheduling can be delayed without losing soundness. For any interleaving that starts from $s_1$ and ends in an erroneous state, there exists an equivalent interleaving where the execution of $t_2$ is delayed at $s_1$. However, the scheduling of thread $t_2$ can be delayed indefinitely resulting in loss of soundness. This situation is called the ignoring problem in partial-order reduction.

Consider the example program 700 in FIG. 7. The initial state of program 700 has two threads $t_1$ and $t_2$ starting to execute functions "T1" and "T2" respectively. The program has one global variable "g," which has an initial value 0. A typical model checking algorithm first schedules $t_1$ to execute the statement at line "L0," which updates the value of "g" to 1. Let us call this state $s_1$. Since the next statement executed by thread $t_1$ from $s_1$ reads and writes only local variables of $t_1$ (namely its program counter) and does not read or write the global variables, partial-order reduction algorithms delay execution of thread $t_2$ at state $s_1$. Continuing, the while loop in lines "L2" and "L3" also reads and writes only the local variables of $t_1$ and thus execution of $t_2$ can be delayed during the execution of these statements as well. However, since reached states are stored, and a newly generated state is not re-explored if it is already present in the set of reached states, a fix-point is reached after executing the loop in "T1" once. Thus, the execution of $t_2$ is delayed indefinitely, and the reduction algorithm can be unsound, and say that the assertion in line "M0" is never violated.

Most partial-order reduction algorithms "fix" the ignoring problem by detecting cycles, and scheduling all threads when a cycle is "closed." Since explicit-state model checkers usually use depth-first search (DFS), cycle detection can be performed by detecting whether a newly generated state is already present in the DFS stack. In the SPIN model checker this is implemented using a bit in the hash table entry for reached states. This bit indicates whether the newly generated successor state is currently also on the depth-first search stack. (See Holzmann, "The Model Checker SPIN," *IEEE Transactions on Software Eng'g*, vol. 23, no. 5, pp. 279-95 (May 1997), for more information on SPIN.)

Cycle detection is neither necessary nor sufficient for transaction-based reduction. First, consider the variant of our current example in FIG. 8. Here, in program 800 we have introduced a nondeterministic choice in line "L2" of procedure "T1." In one branch of the nondeterministic choice, we have a while-loop with statements reading and writing only local variables of thread $t_1$ (lines "L3"-"L4"). The other branch of the nondeterministic choice just terminates the procedure. In this case, even without doing any cycle detection, since one branch of the nondeterministic choice terminates, a partial-order reduction algorithm can schedule thread $t_2$ after procedure "T1" terminates, and thus the assertion violation in line "M0" can be detected. Next, consider the variant of our current example in FIG. 9. Here, in program 900 we have introduced a statement "assume(false)" at line "L2." The assume statement silently stops execution of the program if the argument expression evaluates to false. Thus, some other mechanism in addition to cycle detection is needed to schedule the thread $t_2$ after $t_1$ executes the statement "L1."

In the current literature on transaction-based reduction, the ignoring problem is addressed indirectly by disallowing certain types of infinite executions, such as those consisting of only internal hidden actions, within each thread. (In Flanagan and Qadeer, "Transactions for Software Model Checking," *Electronic Notes in Theoretical Computer Science*, vol. 89, no. 3 (2003), Condition C forbids the transaction from having infinite executions after committing, but without completing. See also the well-formedness assumption "Wf-ifinite-invis" in Stoller et al., "Optimistic Synchronization-based State-space Reduction," *Lecture Notes in Computer Science*, vol. 2619, pp. 489-504 (April 2003)). These assumptions do not hold in practice. In particular, when we analyze models that arise from abstractions (such as predicate abstraction) of programs, it is common to have loops with non-deterministic termination conditions, which violate the above assumptions. Thus, a more direct and computationally effective solution to the ignoring problem is required for wide applicability of transaction-based reduction. Techniques and tools described herein provide a novel solution to this problem.

A new technique called Commit Point Completion (CPC) to solve the ignoring problem without cycle detection is described. The CPC technique for solving the ignoring problem can be implemented for reduction algorithms that use depth-first search. We keep track of the state immediately after the committing action is executed. This state is called the commit point. When a committed transaction completes, we simply mark the commit point as completed. If a committed transaction does not complete on any path leading from the commit point, it will remain unmarked. When an unmarked commit point is about to be popped from the DFS stack, we schedule all threads from that state. The decision to forcibly end a transaction can be delayed up to the time when a commit point is about to be popped from the stack, avoiding taking such a decision prematurely when cycles are closed.

In the example from FIG. 7 the state immediately after $t_1$ executes the statement at line "L0" is a commit point. Due to the non-terminating while loop, the transaction that is committed here never completes. Thus, when this commit point is about to the popped from the DFS stack, it is unmarked, and the CPC algorithm schedules thread $t_2$ from this state, and the assertion violation in line "M0" is detected.

The example from FIG. 8 has an identical commit point. However, since one nondeterministic branch completes the transaction, the commit point gets marked. Thus, when the commit point gets popped from the DFS stack, the other thread $t_2$ is not scheduled. Note that the assertion failure at "M0" is detected even without scheduling thread $t_2$ from the commit point, because $t_2$ will be scheduled by the reduction algorithm after the transaction in $t_1$ completes on one of the nondeterministic branches. By contrast, most existing approaches to the ignoring problem work by cycle-detection, and will schedule thread $t_2$ at the state where the while loop creates a cycle. Our approach shows how to avoid these unnecessary interleaving orders without sacrificing soundness.

Figure 9:
FIG. 9 is a code listing for an example program demonstrating that cycle detection is not sufficient for sound partial-order reduction.

Finally, consider the example from FIG. 9, which also has an identical commit point. Here, the committed transaction does not complete due to the "assume(false)" statement at line "L2." Thus, when this commit point is about to the popped from the DFS stack, it is unmarked, and the CPC algorithm schedules thread $t_2$ from this state, and the assertion violation in line "M0" is detected.

Figure 10:
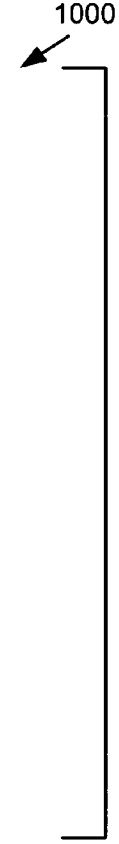
FIG. 10 is a code listing for an example program for an application of a commit point completion algorithm in the presence of left movers.

The above description of the CPC algorithm is simplistic. In the presence of left movers there may be more than one commit point for a transaction, and all of these commit points need to reach a state where the transaction completes to ensure sound reduction. For example, consider the example program 1000 shown in FIG. 10. In this example, there are two global variables "x" and "y" and one mutex "m." All accesses to "x" are protected by mutex "m," and are thus both movers. Accesses to "y" are unprotected, and are hence non-movers. Acquires of mutex "m" are right movers and releases are left movers as mentioned earlier. Thus, when thread "T1" executes the assignment to "y" at label "L1," its transaction commits, since the access to "y" is a non-mover. The resulting state, where y has just been assigned 42 and the program counter of the thread "T1" is at "L2" is a commit point. Due to the infinite while-loop at "L4" this committed transaction never completes, and the CPC algorithm can schedule threads at the above commit point when it is about to be popped from the stack. However, for us to detect the assertion violation at line "M1" of thread "T2," another commit point needs to be established in "T1" after the assignment to "x" at line "L2." We handle this case by designating every state in a committed-transaction obtained by executing a "pure" left mover (a transaction that is a left mover but not a both-mover) as a commit point. Thus, in "T1," the state after executing the release at line "L3" is also designated as a commit point, and the algorithm schedules "T2" when this state is about to be popped, leading to the assertion violation.

The CPC algorithm has been implemented in Microsoft Corporation's Zing model checker. Section II.E presents experimental results that compare the CPC algorithm with a cycle detection algorithm for various Zing programs. The results clearly demonstrate that the CPC algorithm generally explores far fewer states than cycle detection algorithms.

Section II.B introduces notations for describing multithreaded programs precisely. Section II.C gives an abstract framework for sound transaction-based reduction. Section II.D presents the CPC algorithm and a statement of its correctness. Section II.F compares the CPC algorithm with related work.

B. Multithreaded Programs

The store of a multithreaded program is partitioned into the global store Global and the local store Local of each thread. We assume the domains of Local and Global are finite sets. The set Local of local stores has a special store called wrong. The local store of a thread moves to wrong on failing an assertion and thereafter the failed thread does not make any other transitions.

t, u∈Tid={1, ..., n}
i, j∈Choice={1, 2, ...}
g∈Global
l∈Local
ls∈Locals=Tid→Local
  State=Global×Locals A multithreaded program $(g_0, ls_0, T)$ consists of three components. $g_0$ is the initial value of the global store. $ls_0$ maps each thread id t∈Tid to the initial local store $ls_0(t)$ of thread t. We model the behavior of the individual threads using two transition relations:

$$T_G \subseteq Tid \times (Global \times Local) \times (Global \times Local).$$

$$T_L \subseteq Tid \times Local \times Choice \times Local$$

The relation $T_G$ models system visible thread steps. The relation $T_G(t, g, l, g', l')$ holds if thread t can take a step from a state with global store g and local store l, by executing choice i, yielding (possibly modified) stores g' and l'. The relation $T_G$ has the property that for any t, g, l, there is at most one g' and l' such that $T_G(t, g, l, g', l')$. We use functional notation and say that $(g', l')=T_G(t, g, l)$ if $T_G(t, g, l, g', l')$. Note that in the functional notation, $T_G$ is a partial function from Tid×(Global×Local) to (Global×Local). The relation $T_L$ models thread local thread steps. The relation $T_L(t, l, i, l')$ holds if thread t can move its local store from l to l' on choice i. The nondeterminism in the behavior of a thread is captured by $T_L$. This relation has the property that for any t, l, i, there is a unique l' such that $T_L(t, l, i, l')$.

The program starts execution from the state $(g_0, ls_0)$. At each step, any thread may make a transition. The transition relation $\rightarrow_t \subseteq State \times State$ of thread t is the disjunct of the system visible and thread local transition relations defined below. For any function h from A to B, a ∈ A and b ∈ B, we write h[a:=b] to denote a new function such that h[a:=b](x) evaluates to h(x) if x≠a, and to b if x=a.

$$\frac{T_G(t, g, ls(t), g', l') \quad T_L(t, ls(t), i, l')}{(g, ls) \rightarrow_t (g', ls[t := l'])(g, ls) \rightarrow_t (g, ls[t := l'])}$$

The transition relation $\rightarrow \subseteq State \times State$ of the program is the disjunction of the transition relations of the various threads.

$$\rightarrow = \exists t. \rightarrow_t$$

C. Transactions

Transactions occur in multithreaded programs because of the presence of right and left movers. In this section, we assume that right and left movers are known as a result of a previous analysis.

Let RM, LM $\subseteq T_G$ be subsets of the transition relation $T_G$ with the following properties for all t≠u:

1. If RM $(t, g_1, l_1, g_2, l_2)$ and $T_G(u, g_2, l_3, g_3, l_4)$, there is $g_4$ such that $T_G(u, g_1, l_3, g_4, l_4)$ and RM $(t, g_4, l_1, g_3, l_2)$.
2. If $T_G(u, g_1, l_1, g_2, l_2)$ and RM $(t, g_2, l_3, g_3, l_4)$, then for all g', l', $T_G(t, g_1, l_3, g', l') \Rightarrow$ RM $(t, g_1, l_3, g', l')$.
3. If $T_G(u, g_1, l_1, g_2, l_2)$ and LM $(t, g_2, l_3, g_3, l_4)$, there is $g_4$ such that LM $(t, g_1, l_3, g_4, l_4)$ and $T_G(u, g_4, l_1, g_3, l_2)$.
4. If $T_G(u, g_1, l_1, g_2, l_2)$ and LM $(t, g_1, l_3, g_3, l_4)$, there is $g_4$ such that LM $(t, g_2, l_3, g_4, l_4)$.

The first property states that a right mover action in thread t commutes to the right of a transition of a different thread u. The second property states that if a right mover of thread t is enabled in the post-state of a transition of another thread u, and thread t is enabled in the pre-state, then the transition of thread t is a right mover in the pre-state. The third property states that a left mover of thread t commutes to the left of a transition of a different thread u. The fourth property states that a left mover that is enabled in the pre-state of a transition by another thread is also enabled in the post-state.

Our analysis is parameterized by the values of RM and LM and only requires that they satisfy these four properties. The larger the relations RM and LM, the longer the transactions our analysis infers. Therefore, these relations should be as large as possible in practice.

In order to minimize the number of explored interleaving orders and to maximize reuse, we would like to infer transactions that are as long as possible (e.g., maximal with respect to a given thread). To implement this inference, we introduce in each thread a Boolean local variable to keep track of the phase of that thread's transaction. In this detailed example, this instrumentation is done automatically, and not by a programmer. (Alternatively, the instrumentation may be done in other ways.) The phase variable of thread t is true if thread t is in the right mover (or pre-commit) part of the transaction; otherwise the phase variable is false. We say that the transaction commits when the phase variable moves from true to false. The initial value of the phase variable for each thread is false.

$p, p' \in Boolean = \{false, true\}$
$l, l' \in Local^{\#} = Local \times Boolean$
$ls, ls' \in Locals^{\#} = Tid \to Local^{\#}$
$State = Global \times Locals^{\#}$ Let Phase(t, (g, ls)), the phase of thread t in state (g, ls) be the second component of ls(t).

The initial value of the global store of the instrumented program remains $g_0$. The initial value of the local stores changes to $ls_0$, where $ls_0(t) = \langle ls_0(t), false \rangle$ for all $T \in Tid$. We instrument the transition relations $T_G$ and $T_L$ to generate a new transition relation $T^{\#}$.

$T^{\#} \subseteq Tid \times (Global \times Local^{\#}) \times Choice \times (Global \times Local^{\#}) \vee T_G(t,g,l,g',l') \wedge$ $T^{\#}(t,g,\langle l,p \rangle, i,g', \langle l',p' \rangle) \underline{def} p' = (RM(t,g,l,g',l') \vee (p \vee \neg, LM(t,g,l,g',\overline{l'}))) \vee T_L(t,l,i,l') \wedge g=g' \wedge p'=p$ In the definition of $T^{\#}$, the relation between p' and p reflects that if p is true, then p' continues to be true as long as it executes right mover transitions. The phase changes to false as soon as the thread executes an action that is not a right mover. Thereafter, it remains false as long as the thread executes left movers. Then, it becomes true again as soon as the thread executes an action that is a right mover and not a left mover. A transition from $T_L$ does not change the phase. We overload the transition relation $\to_t$ defined in Section II.B to represent transitions in the instrumented transition relation. Similar to the functional notation defined for $T_G$ in Section II.B, we sometimes use functional notation for $T^{\#}$.

Given an instrumented transition relation $T^{\#}$, we define three sets for each thread t: $R(t), L(t), N(t) \subseteq State^{\#}$. These sets respectively define when a thread is executing in the right mover part of a transaction, the left mover part of a transaction, and outside any transaction. These three sets are a partition of $State^{\#}$ defined as follows:

$R(t) = \{(g,ls) | \exists l.ls(t) = \langle l, true \rangle \wedge l \notin \{ls_0(t), wrong\}\}$.
$L(t) = \{(g,ls) | \exists l.ls(t) = \langle l, false \rangle \wedge l \notin \{ls_0(t), wrong\} \wedge (\exists i, g', l'. LM(t,g,l,g',l') \vee T_L(t,l,i,l'))\}$.
$N(t) = State^{\#} \setminus (R(t), L(t))$.

The definition of R(t) says that thread t is in the right mover part of a transaction if and only if the local store of t is neither its initial value nor wrong and the phase variable is true. The definition of L(t) says that thread t is in the left mover part of a transaction if and only if the local store of t is neither its initial value nor wrong, the phase variable is false, and there is an enabled transition that is either a left mover or thread-local. Note that since the global transition relation is deterministic, the enabled left mover is the only enabled transition that may access a global variable. Since (R(t), L(t), N(t)) is a partition of $State^{\#}$, once R(t) and L(t) have been picked, the set N(t) is implicitly defined.

With reference to FIG. 11, a sequence of states is called a sequence of transactions if
for all $1 \leq m \leq k$, if $p_m = p_{m,1} \to_{t(m)} \cdots \to_{t(m)} p_{m,x} = p_{m+1}$, then
(1) $p_{m,1} \in N(t(m))$, (2) $p_{m,2}, \ldots, p_{m,x-1} \in R(t(m)) \vee L(t(m))$, and (3) $p_{m,x} \in L(t(m)) \vee N(t(m))$.
for all $1 \leq m \leq l$, if $q_m = q_{m,1} \to_{u(m)} \cdots \to_{u(m)} q_{m,x} = q_{m+1}$, then
(1) $q_{m,1} \in N(u(m))$, (2) $q_{m,2}, \ldots, q_{m,x} \in R(u(m))$.

Intuitively, for every $i, p_i \to_{t(m)}^+ p_{i+1}$ is a committed transaction and for every $j, q_j \to_{u(j)}^+ q_{j+1}$ is an uncommitted transaction.

The following theorem says that for any sequence in the state space that reaches a state where some thread t goes wrong, there exists a corresponding sequence of transactions that reaches a corresponding state at which thread t goes wrong.

Theorem 1. Let $P = (g_0, ls_0, T^{\#})$ be the instrumented multi-threaded program. For all $t \in Tid$, let $W(t) = \{(g,ls) | \exists p.ls(t) = \langle wrong, p \rangle\}$. For any state $(g',ls') \in W(t)$ that is reachable from $(g_0, ls_0)$, there is another state $(g'',ls'') \in W(t)$ that is reachable from $(g_0, ls_0)$ by a sequence of transactions.

A detailed proof of this theorem can be found in Appendix A.

As a consequence of this theorem, it suffices to explore only transactions to find errors. This is the basis for described model checking algorithms.

Using the values of N(t) for all $t \in Tid$, we model check the multithreaded program by computing the least fixpoint of the set of rules 1200 in FIG. 12. This model checking algorithm schedules a thread only when no other thread is executing inside a transaction. This algorithm is potentially unsound for the following reason. If a transaction in thread t commits but never finishes, the shared variables modified by this transaction become visible to other threads. However, the algorithm does not explore transitions of other threads from any state after the transaction commits. Section II.D presents a more sophisticated algorithm which ensures that all threads are explored from some state in the post-commit phase of every transaction.

D. Commit Point Completion

This section describes a detailed CPC algorithm and gives its soundness proof. The algorithm uses depth-first search (DFS). In this example, each state in the DFS stack is encapsulated using a "TraversalInfo" record 1300 shown in FIG. 13. In addition to the state, the "TraversalInfo" record 1300 records:

"tid," the id of the thread used to reach the state,
"numTids," the number of threads active in the state,
"choice," the current index among the nondeterministic choices executable by thread "tid" in this state,
"LM," a Boolean which is set to true if and only if the action used to reach this state is a left mover,
"RM," a Boolean which is set to true if and only if the action used to reach this state is a right mover,
"Xend," a Boolean which is set to true if and only if the algorithm decides to schedule other threads at this state, and
"CPC," a Boolean which is relevant for only states with "phase" equal to false, and is set to true by the algorithm if there exists a path of transitions of the thread generating the state to a state where all threads are scheduled.

FIG. 14 gives two variants of the CPC algorithm (with and without line "L19"). (Other variants also are possible.) In program 1400, the statement at "L4" peeks at the Traversalinfo record "q" on top of the stack and explores all successors of the state using actions from thread "q.tid". If the phase of q is false, then for each such successor q', if the action used to generate q' is not a left-mover, then we update "q.Xend" to true at label "L7." The invariant associated with the "CPC" flag is the following: If q is about to be popped from the stack, and "q.CPC" is true and Phase(q.tid, q.state) is false then there exists a path to a state where "Xend" is true. Thus, at label "L10" we set "q.CPC" to true if "q.Xend" is true. The "Xend" and "CPC" fields are also updated when a TraversalInfo record is popped from the stack. In particular, at label "L18" when q is about to be popped from the stack, if its phase is false and "q.CPC" is false, then we set "q.Xend" to true and force scheduling of all threads at q. If "q.Xend" is true, then at label "L24" we ensure that all threads are scheduled from q.

FIG. 15 contains helper procedures for the CPC algorithm. The helper functions for the CPC algorithm perform the following actions. "Enabled" determines whether the current thread has a transition enabled at a given state. "Execute" applies the transition relation $T^\#$ to the current state. "Update" schedules the next thread to run.

A key invariant preserved by the algorithm is the following: Suppose a Traversalinfo record q is about to be popped from the search stack and "q.CPC" is true. Then there is a sequence of left mover transitions of thread "q.tid" to a state represented in some Traversalinfo record q' such that "q'.Xend" is true. We can show this by induction on the order in which TraversalInfo records are popped from the stack. More detail is provided below in Appendix A.

Without the optimization in line "L19," the CPC algorithm ensures that for every TraversalInfo record q explored by the algorithm such that "q.state" is in the post-commit part of the transaction, there exists a sequence of transitions to some other state where all threads are scheduled. With the optimization in line "L19," the CPC algorithm guarantees this property only for a subset of states in the post-commit part of the transaction that are reached by pure left movers as stated below.

Theorem 2. Let q be a TraversalInfo constructed during the execution of the CPC algorithm such that q.RM=false. Then at line "L21" there exists a sequence of left-mover transitions of thread q.tid from q.state to (g', ls') and all threads are explored from (g', ls').

Finally, Theorem 3 concludes that if there is a state in the multithreaded program where a thread goes wrong that is reachable from the initial state the CPC algorithm will find a state that is reachable from the initial state where that thread goes wrong.

Theorem 3. If there is an execution of the multithreaded program from ($g_0$, $ls_0$) to (g, ls') and a thread t such that ls(t)=wrong, then there is another state (g', ls') where the CPC algorithm visits (g', ls') and ls'(t)=wrong.

The proof involves using Theorem 1 to first produce a sequence of transactions that also reach a state where thread t goes wrong, and then using Theorem 2 to transform this latter sequence into another sequence that will be explored by the CPC algorithm. More detail is provided below in Appendix A.

E. Experimental Results

Figure 16:
FIG. 16 is a table showing experimental results for a commit point completion algorithm.

We implemented the CPC algorithm in Microsoft Corporation's Zing software model checker. Table 1600 in FIG. 16 gives the number of states explored by Zing on various example programs using three variants of the reduction algorithm. The column labeled "Lines of Code" gives the number of lines of code in the Zing program. The column labeled "Unsound Reduction" gives the number of states explored by a reduction algorithm which does not solve the ignoring problem. This gives a lower bound on the number of states that need to be explored by any sound algorithm. The column labeled "CPC" gives the number of states explored by the CPC algorithm. The column labeled "Cycle Detection" gives the number of states explored by a sound algorithm which forcibly ends a transaction whenever a cycle is encountered in the post-commit part of the transaction.

The number of states explored is a measure of the running time of the algorithm. The smaller the number of states explored by a sound algorithm, the faster the tool is.

The programs are classified into four groups. The first three programs ("AuctionHouse," "FlowTest" and "Shipping") were produced by translating to Zing from the Business Process Execution Language ("BPEL"). (See Cubera et al., "Business Process Execution Language for Web Services, Version 1.0," *IBM developerWorks*, (July 2002), for more information on BPEL.) They represent workflows for business processes, and have mostly acyclic state spaces. In these examples, the numbers of states explored by the CPC and Cycle Detection algorithms are identical or close to the number of states explored by the Unsound Reduction algorithm.

The next three programs ("Conc," "Peterson" and "Bluetooth") were produced by automatic abstraction refinement from concurrent C programs. The SLAM toolkit was adapted to concurrent programs by using Zing as a back-end model checker instead of Bebop. (See Ball et al., "The SLAM Project: Debugging System Software Via Static Analysis," *POPL 02: ACM SIGPLAN-SIGACT Symp. on Principles of Programming Languages*, pp. 1-3 (January 2002), for more information on the SLAM toolkit.) These examples all have loops that terminate non-deterministically in the abstraction. Thus, the cycle detection algorithm forces interleaving of all threads in these loops, whereas the CPC algorithm avoids interleaving all threads in the loops without losing soundness. The CPC algorithm significantly outperforms the Cycle Detection algorithm on these examples.

The "TransactionManager" program was automatically translated to Zing from C#, after a few manual abstractions and manually closing the environment. It is one of the larger Zing examples. Since the manual abstraction did not result in non-deterministically terminating loops, the CPC algorithm performs only marginally better than the Cycle Detection algorithm.

The final three programs represented in table 1600 ("AlternatingBit," "Philosophers" and "Bakery") are standard toy examples used by the formal verification community. In the first two examples, CPC performs better than Cycle Detection. In the "Bakery" example we find that the Cycle Detection algorithm performs slightly better than the CPC algorithm. This is possible, since the total number of states is counted over all transactions, and this implementation of the CPC algorithm gives optimality only within a single transaction. Heuristically, this should translate to smaller number of states explored over all the transactions, but this example shows that this is not always the case.

Overall, the results clearly demonstrate that CPC is a good algorithm for making reduction sound, without forcing interleavings in all loops. It generally explores fewer states than Cycle Detection, and outperforms Cycle Detection in examples with non-deterministic loops. Such examples arise commonly from automatic abstraction refinement.

F. Comparisons

Partial order reduction has numerous variants. The most commonly used variants are stubborn sets of Valmari, ample sets, and sleep sets. See, e.g., Valmari, "A Stubborn Attack on State Explosion (abridged version)," *Proc. 2nd Int'l Workshop on Computer Aided Verification*, pp. 156-65 (1990); Clarke and Grumberg, *Model Checking*, MIT Press (1999); Peled, "Partial Order Reduction: Model-Checking Using Representatives," *Proc. 21st Int'l Symp. on Mathematical Foundations of Computer Science*, pp. 93-112 (September 1996); Godefroid et al., *Partial-Order Methods for the Verification of Concurrent Systems: An Approach to the State-Explosion Problem*, Springer-Verlag (1996). Most of these approaches handle the ignoring problem by using some variant of cycle detection. In another paper, Valmari proposes detecting Strongly Connected Components (SCCs) to solve the ignoring problem. See Valmari, "Stubborn Sets for Reduced State Space Generation," in *Advances in Petrinets*, Springer-Verlag (1990). Valmari's algorithm involves detecting terminal strongly connected components, and forces scheduling of other threads from at least one state in each of the terminal strongly connected components. In contrast, the CPC algorithm does not directly compute any strongly connected components. Also, the CPC algorithm terminates transactions at fewer points than Valmari's algorithm.

Figures 17, 18:
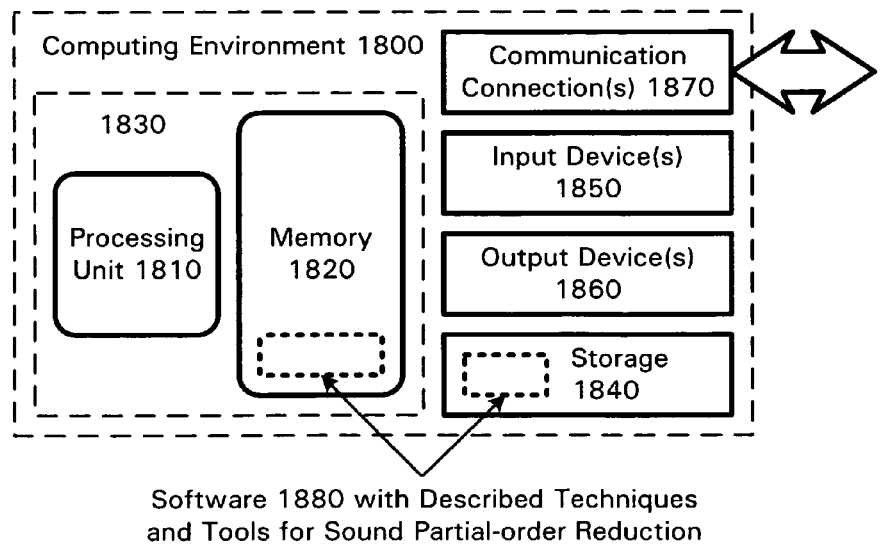
FIG. 17 is a code listing for an example program illustrating a distinction between a commit point completion algorithm and strongly connected component algorithm.
FIG. 18 is a block diagram of a suitable computing environment for implementing described techniques and tools for partial-order reduction.

Consider the example program 1700 in FIG. 17. In program 1700, a transaction commits at the state after executing line "L0" followed by a non-deterministic branch at line "L2." Each of the branches produce terminal SCCs in the state space. Valmari's algorithm appears to force scheduling "T2" at each of these terminal SCCs, whereas the CPC algorithm forces scheduling "T2" only once, at the commit point (label "L1").

Transaction based reduction was originally developed by Lipton. See Lipton, "Reduction: A Method of Proving Properties of Parallel Programs," *Communications of the ACM*, vol. 18, no. 12, pp. 717-21 (December 1975). Work by Stoller and Cohen uses a locking discipline to aggregate transitions into a sequence of transitions that may be viewed atomically. See Stoller et al., "Optimistic Synchronization-based State-space Reduction," *Lecture Notes in Computer Science*, vol. 2619, pp. 489-504 (April 2003). Flanagan and Qadeer augment this approach with right movers to get further reduction. See Flanagan and Qadeer, "Transactions for Software Model Checking," *Electronic Notes in Theoretical Computer Science*, vol. 89, no. 3 (2003). This idea is combined with procedure summarization by Qadeer, Rajamani, and Rehof in "Summarizing Procedures in Concurrent Programs," *POPL 04: ACM SIGPLAN-SIGACT Symp. on Principles of Programming Languages*, pp. 245-55, Venice, Italy (January 2004). As mentioned earlier, all of these papers address the ignoring problem only indirectly by disallowing certain types of infinite executions, such as those consisting of only internal hidden actions, within each thread.

The Verisoft implementation does not use the detection of cycles or strongly connected components, rather a timeout is used to detect an infinite execution that is local to a particular process. Other cycles are broken by limiting the search depth or using a driver that generates a finite number of external events. See Godefroid, "Model Checking for Programming Languages Using Verisoft," *POPL: 24th ACM Symp. on Principles of Programming Languages*, pp. 174-186 (January 1997). Dwyer et al. use the notion of a locking discipline to increase the number of transitions that can form an ample set for a process. The algorithms presented use the standard cycle detection technique to insure soundness. See Dwyer et al., "Exploiting Object Escape and Locking Information in Partial-Order Reductions for Concurrent Object-Oriented Programs,"

G. Conclusion

Explicit state model checkers for concurrent programs usually use cycle detection to solve the ignoring problem. Since explicit state model checkers use DFS, cycle detection checks if a newly generated state is already on the DFS stack, and schedules all pending threads. Cycle detection is neither necessary nor sufficient to ensure sound reduction. A CPC algorithm does not schedule all delayed threads when cycles are closed. Instead, we designate certain states as commit points, and postpone the decision to schedule all delayed threads to the point of time when a commit point is about to be popped from the DFS stack. If a commit point reaches a state in the reduced exploration where delayed threads are scheduled, then no extra scheduling needs to be done at the commit point. Otherwise, delayed threads are scheduled at the commit point. This decision is taken when the commit point is popped from the stack, when we have information about all the transitive successors of the commit point.

A CPC algorithm generally explores fewer states than cycle detection, while still ensuring sound reduction. In particular, a CPC algorithm outperforms cycle detection in examples that arise from iterative abstraction refinement.

Though the CPC algorithm in this detailed example was presented using the terminology of Lipton's transactions, the idea is applicable to other variants of partial-order reduction as well. The ignoring problem also arises when attempting to build summaries for multithreaded programs. An implementation of summaries in Zing also uses the core idea of a CPC algorithm to ensure soundness.

III. Computing Environment

The techniques and tools described herein can be implemented on any of a variety of computing devices and environments, including computers of various form factors (personal, workstation, server, handheld, laptop, tablet, or other mobile), distributed computing networks, and Web services, as a few general examples. The techniques and tools can be implemented in hardware circuitry, as well as in software executing within a computer or other computing environment, such as shown in FIG. 18.

FIG. 18 illustrates a generalized example of a suitable computing environment 1800 in which described techniques and tools can be implemented. The computing environment 1800 is not intended to suggest any limitation as to scope of use or functionality of the invention, as the present invention may be implemented in diverse general-purpose or special-purpose computing environments.

With reference to FIG. 18, the computing environment 1800 includes at least one processing unit 1810 and memory 1820. In FIG. 18, this most basic configuration 1830 is included within a dashed line. The processing unit 1810 executes computer-executable instructions and may be a real or a virtual processor. In a multi-processing system, multiple processing units execute computer-executable instructions to increase processing power. The memory 1820 may be volatile memory (e.g., registers, cache, RAM), non-volatile memory (e.g., ROM, EEPROM, flash memory, etc.), or some combination of the two. The memory 1820 stores software 1880 implementing described techniques and tools for computer program testing.

A computing environment may have additional features. For example, the computing environment 1800 includes storage 1840, one or more input devices 1850, one or more output devices 1860, and one or more communication connections 1870. An interconnection mechanism (not shown) such as a bus, controller, or network interconnects the components of the computing environment 1800. Typically, operating system software (not shown) provides an operating environment for other software executing in the computing environment 1800, and coordinates activities of the components of the computing environment 1800.

The storage 1840 may be removable or non-removable, and includes magnetic disks, magnetic tapes or cassettes, CD-ROMs, CD-RWs, DVDs, or any other medium which can be used to store information and which can be accessed within the computing environment 1800. For example, the storage 1840 stores instructions for implementing software 1880.

The input device(s) 1850 may be a touch input device such as a keyboard, mouse, pen, or trackball, a voice input device, a scanning device, or another device that provides input to the computing environment 1800. The output device(s) 1860 may be a display, printer, speaker, CD-writer, or another device that provides output from the computing environment 1800.

The communication connection(s) 1870 enable communication over a communication medium to another computing entity. The communication medium conveys information such as computer-executable instructions, audio/video or other media information, or other data in a modulated data signal. By way of example, and not limitation, communication media include wired or wireless techniques implemented with an electrical, optical, RF, infrared, acoustic, or other carrier.

Techniques and tools described herein can be described in the general context of computer-readable media. Computer-readable media are any available media that can be accessed within a computing environment. By way of example, and not limitation, with the computing environment 1800, computer-readable media include memory 1820, storage 1840, communication media, and combinations of any of the above.

Some techniques and tools herein can be described in the general context of computer-executable instructions, such as those included in program modules, being executed in a computing environment on a target real or virtual processor. Generally, program modules include functions, programs, libraries, objects, classes, components, data structures, etc. that perform particular tasks or implement particular abstract data types. The functionality of the program modules may be combined or split between program modules as desired. Computer-executable instructions may be executed within a local or distributed computing environment.

Having described and illustrated the principles of our innovations in the detailed description and the accompanying drawings, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

In view of the many possible embodiments to which the principles of our invention may be applied, we claim as our invention all such embodiments as may come within the scope and spirit of the following claims and equivalents thereto.

We claim:

1. A method performed by a computer of performing a sound transaction-based reduction on a state space to facilitate model checking for a concurrent computer program having plural threads, the method comprising:
    exploring an execution path for a first thread of the plural threads in the concurrent computer program;
    delaying execution of a second thread of the plural threads in the concurrent computer program;
    determining a commit point for the first thread;
    determining whether a path from the first thread to the delayed second thread exists after the commit point;
    if no path from the first thread to the delayed second thread exists after the commit point, scheduling the delayed second thread for execution; and
    if a path from the first thread to the delayed second thread exists after the commit point, omitting scheduling of the delayed second thread without performing cycle detection in the execution path for the first thread.

2. The method of claim 1 wherein the determining a commit point comprises:
    in a transaction comprising a sequence of one or more right movers followed by a sequence of one or more left movers, determining a committing action that follows the sequence of one or more right movers and precedes the sequence of one or more left movers associated with the first thread;
    wherein the commit point comprises a program state immediately following the committing action.

3. The method of claim 2 wherein the committing action comprises an action of the first thread that potentially affects the delayed second thread.

4. The method of claim 2 wherein the committing action comprises an action on a shared variable.

5. The method of claim 1 wherein exploring the execution path for the first thread comprises, prior to the commit point, exploring one or more local actions of the first thread.

6. The method of claim 1 wherein the determining whether a path from the first thread to the delayed second thread exists after the commit point comprises a sound depth-first search.

7. The method of claim 1 wherein no path from the first thread to the delayed second thread exists following the commit point due to a cycle in the execution path following the commit point.

8. The method of claim 1 further comprising:
    determining that a path from the first thread to one or more delayed other threads exists after the commit point; and
    omitting scheduling of the one or more delayed other threads.

9. A computer-readable storage medium having stored thereon computer-executable instructions for performing the method of claim 1.

10. A method performed by a computer of performing a sound transaction-based reduction on a state space of a multi-threaded computer program, the method comprising:
    determining a point in a first thread following an atomic action of a transaction in the multi-threaded computer program;
    analyzing one or more execution paths from the point in the first thread following the atomic action to determine whether a path from the first thread to a delayed thread exists after the point in the first thread following the atomic action;
    if no path from the first thread to the delayed thread exists after the point following the atomic action of the transaction, scheduling the delayed thread for execution; and
    if a path from the first thread to the delayed thread exists after the point following the atomic action of the transaction, omitting scheduling of the delayed thread without cycle detection in the first thread.

11. The method of claim 10 wherein the atomic action potentially affects at least one other thread in the multi-threaded computer program.

12. The method of claim 10 wherein the atomic action comprises an action on a variable shared by the first thread and another thread in the multi-threaded computer program.

13. The method of claim 10 further comprising, prior to the atomic action, exploring one or more local actions of the first thread.

14. The method of claim 10 wherein the analyzing comprises a depth-first search of the one or more execution paths.

15. The method of claim 10 wherein the analyzing indicates a cycle in at least one of the one or more execution paths following the atomic action.

16. The method of claim 15 further comprising omitting scheduling of the one or more delayed threads at the cycle.

17. A computer-readable storage medium having stored thereon computer-executable instructions for performing the method of claim 10.

* * * * *

UNITED STATES PATENT AND TRADEMARK OFFICE
CERTIFICATE OF CORRECTION

PATENT NO.        : 7,650,595 B2                                        Page 1 of 1
APPLICATION NO. : 11/119530
DATED             : January 19, 2010
INVENTOR(S)       : Qadeer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1239 days.

Signed and Sealed this

Twenty-third Day of November, 2010

David J. Kappos
*Director of the United States Patent and Trademark Office*